3,000,773
Patented Sept. 19, 1961

3,000,773
METHOD OF DESEALING LAMINATED OPTICAL ELEMENTS
Arthur M. Shapiro, Philadelphia, Pa., assignor to the United States of America as represented by the Secretary of the Army
No Drawing. Filed Oct. 22, 1959, Ser. No. 848,166
1 Claim. (Cl. 154—120)
(Granted under Title 35, U.S. Code (1952), sec. 266)

The invention described herein may be manufactured and used by or for the Government for governmental purposes without the payment to me of any royalty thereon.

This invention relates to the desealing of optical elements which are bonded together by cements of the polyester and polysulfide types. It has for its purpose to provide an improved method whereby such elements may be separated quickly by a non-corrosive solvent without special equipment and with the separated surfaces free from any residue of the bonding cement.

It is often difficult to deseal glass optics with currently used desealants. Either the desealants (1) leave particles of cement which require further processing of the optics, (2) are corrosive and require special handling facilities, or (3) require long periods of time for the desealing process. Days are often required at room temperature, and some materials cannot be used at elevated temperatures because of the loss of volatile components.

This is especially true of polyester cements such as consist of a polyester resin dissolved in styrene in the ratio of 3 to 2, the polyester being made by reacting propylene glycol with bicyclo (2,2,1) 5-heptene-2,3-dicarboxylic anhydride. The same is true of a polysulfide rubber type cement such as has for its base polymer a synthetic rubber of the polysulfide type, this being mixed with an accelerator prior to its use.

In accordance with the present invention, glass optics, bonded by the above cements are desealed by immersing them in dimethyl sulfoxide which is maintained at a temperature in excess of 200° F. until the elements separate. Below this temperature, a disproportionate length of time is required to complete the desealing. Usable temperatures are 200 to 372° F., the latter being the boiling point of the dimethyl sulfoxide.

At temperatures of 225 to 250° F., optics of one to two inches in diameter are debonded in a period of one to three hours, the optics separating cleanly without any residue of the bonding cement. As previously indicated, the above described method has the advantage that the cement solvent is non-corrosive, requires no special equipment, and effects complete removal of the cement within a relatively short period of time.

I claim:

A method of desealing optical elements bonded by a cement selected from the group consisting of a polyester resin dissolved in styrene in the ratio of about 3 to 2 respectively and a polysulfide rubber, which comprises the steps of: placing said bonded elements in dimethyl sulfoxide, heating said dimethyl sulfoxide to a temperature of about 225 to 250° F. and maintaining said temperature until said bonded elements separate.

References Cited in the file of this patent

UNITED STATES PATENTS

| | | |
|---|---|---|
| 319,153 | Wells | June 2, 1885 |
| 837,444 | Borsch | Nov. 21, 1899 |
| 1,748,079 | Randall | Feb. 25, 1930 |
| 2,548,718 | George et al. | Apr. 10, 1951 |
| 2,635,089 | Anderson | Apr. 14, 1953 |
| 2,843,925 | Logue et al. | July 22, 1958 |
| 2,925,442 | Goheen et al. | Feb. 16, 1960 |